United States Patent [19]
Thantrakul et al.

[11] Patent Number: 5,816,842
[45] Date of Patent: Oct. 6, 1998

[54] SELF-ALIGNING, MATING ELECTRONIC CONNECTOR ASSEMBLY

[75] Inventors: Virat Thantrakul, La Crescenta; Scott W. Baxter, Moorpark; Harold R. Teague, Thousand Oaks; Jasmen Dorian, Glendale; Michael A. Rosales, Jr., La Canada, all of Calif.

[73] Assignee: Seagate Technology, Inc., San Jose, Calif.

[21] Appl. No.: 772,171

[22] Filed: Dec. 20, 1996

Related U.S. Application Data

[63] Continuation-in-part of Ser. No. 772,171, Nov. 25, 1996.
[51] Int. Cl.⁶ .................................................. H01R 13/64
[52] U.S. Cl. ............................................ 439/374; 439/680
[58] Field of Search .............................. 439/79, 374, 378, 439/677, 680

[56] References Cited

U.S. PATENT DOCUMENTS

| | | | |
|---|---|---|---|
| 5,370,556 | 12/1994 | Olsson | 439/680 X |
| 5,466,171 | 11/1995 | Bixler et al. | 439/680 X |
| 5,624,279 | 4/1997 | Clark et al. | 439/680 |
| 5,637,019 | 6/1997 | Crane, Jr. et al. | 439/374 X |
| 5,674,094 | 10/1997 | Hutchinson, Jr. et al. | 439/680 |

*Primary Examiner*—Khiem Nguyen
*Attorney, Agent, or Firm*—Merchant, Gould, Smith, Edell, Welter & Schmidt

[57] ABSTRACT

A pair of mating electronic connectors each have non-conductive housings with portions thereof configured to properly align the connectors when one is inserted into the other to provide an electrical connection between respective electronic components. A first electronic connector includes a pin supporting wall and a plurality of conductive pins extending perpendicularly from an outboard side of the wall. A second electronic connector includes a plurality of mating guides which extend outwardly from a front side thereof, that slidably engage corresponding portions of the first electronic connector housing to properly align the connectors prior to inserting the conductive pins into pin receiving apertures of the second electronic connector. The mating connectors include corresponding keys and slots or channels that ensure proper alignment of the connectors when one is inserted into the other. The first electronic connector further includes a plurality of soldertails corresponding to the conductive pins and extending from an inboard side of the wall, and a plurality of gripper arms which extend from an inboard side of the connector housing for receiving and securing an edge of a printed circuit board assembly (PCBA) therein through an interference fit such that the soldertails engage only one side of the PCBA. Each gripper arm defines a slot having crush ribs into which the edge of the PCBA is inserted. A pair of mounting ears extend from a respective pair of the gripper arms, and are configured to receive a mounting screw therethrough for attaching the electronic connector to a support structure.

20 Claims, 2 Drawing Sheets

FIG. 3
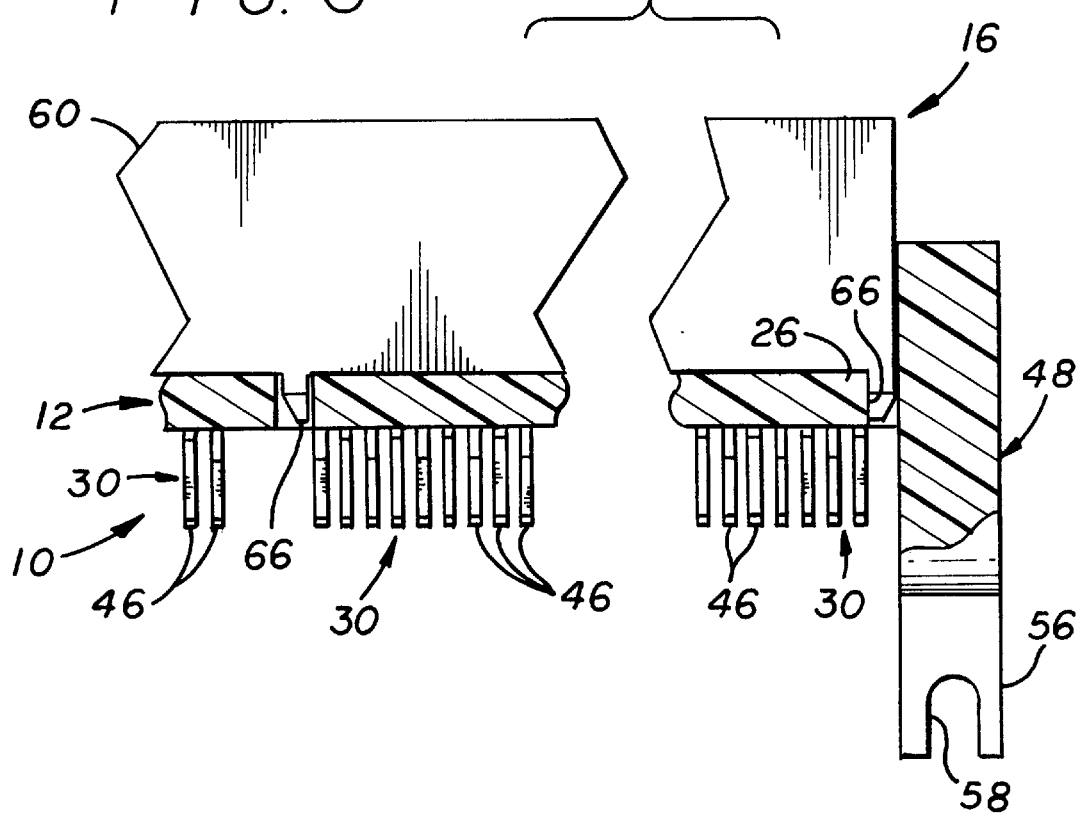
FIG. 4
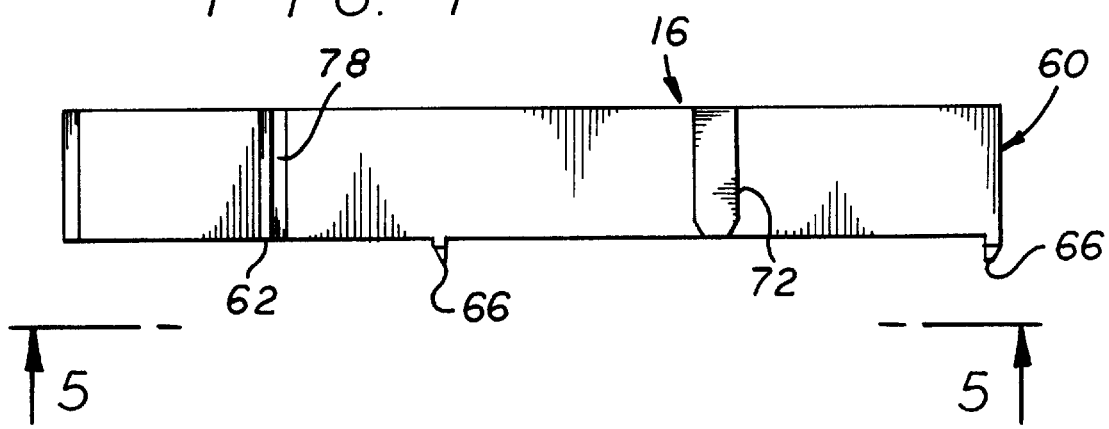
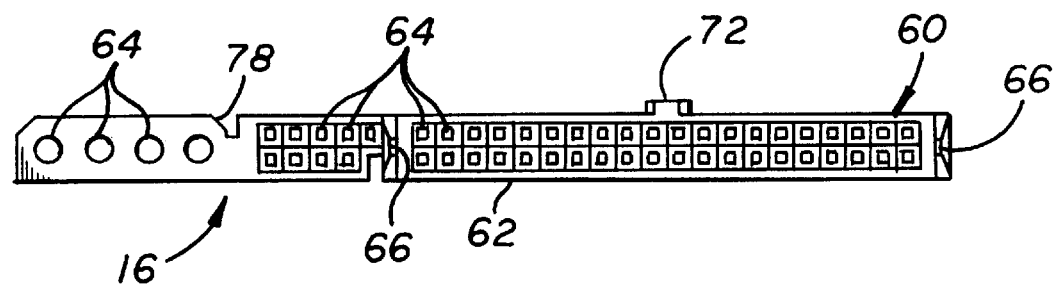
FIG. 5

SELF-ALIGNING, MATING ELECTRONIC CONNECTOR ASSEMBLY

RELATED APPLICATION

This is a continuation-in-part of U.S. patent application Ser. No. 08/772,171, filed Nov. 25, 1996 for SINGLE-SIDED ELECTRONIC CONNECTOR AND METHOD OF ASSEMBLY.

BACKGROUND OF THE INVENTION

This invention relates generally to electronic connectors associated with computer components and printed circuit board assemblies (PCBA). More specifically, the present invention relates to a self-aligning, mating electronic connector assembly wherein the connector components include mating guides, keys and slots or channels for proper alignment of the components prior to inserting conductive pins into pin receiving apertures.

In recent years microcomputer equipment, particularly personal and desk top computers, have become extremely popular for a wide variety of home, business and commercial uses. Such computers commonly include a main central processor unit having one or more memory storage disks. In many modern computers, the storage disk or disks, sometimes referred to as "hard disks," are provided as part of a Winchester-type disk drive unit having the storage disks supported in a stack on a rotary spindle within a substantially sealed disk drive housing. The disks are rotatably drive in unison by a small spindle motor, and one or more electromagnetic heads on a movable positioning arm are displaced by a precision stepper motor to traverse surfaces of the rotating disks for purposes of reading and writing data. Such Winchester-type disk drive units are generally preferred in comparison with so-called floppy-type disk drives due to their higher memory storage capacities and faster operating speeds.

Typically, such computer disk drive units or "hard drive assemblies" (HDA) include a housing having a base and a removable cover which collectively define a disk storage compartment therebetween. A shaft is fixed to the base and extends therefrom toward the housing cover, and one or more memory storage disks are mounted for rotation within the disk storage compartment about the shaft. The shaft and the memory storage disks comprise a memory storage unit which, with other related components situated within the disk storage compartment, are manufactured to very precise manufacturing specifications.

Often a printed circuit board assembly (PCBA) is mounted directly to a disk drive unit housing. An electronic connector is typically mounted to the PCBA prior to assembly of the PCBA to the disk drive unit, to provide an electronic interface between the disk drive unit or hard drive assembly and the main central processor unit. The electronic connector typically has a standard configuration, i.e., SCSI (small computer system interface), SCA (single connector attach) or AT and, in the past, has been press-fit to the PCBA. One disadvantage in such an assembly of the electronic connector to the PCBA is that automated assembly of these two components has not been possible. Of course, improvements to the design of the various components associated with the hard drive assembly, printed circuit board and electronic connector, which would facilitate automatic assembly of these components to one another would be considered by those in the industry to be highly desirable.

The electronic connector associated with the PCBA typically includes a number of conductive pins which extend generally perpendicularly from a pin supporting wall away from the PCBA within a receptacle-forming enclosure of the housing. The pins are often found in distinct groupings, i.e., power pins, I/O pins and jumpers, to which separate mating connectors are joined. Thus, for example, when a 3-in-1 AT connector is associated with a PCBA, three separate mating connectors are typically "plugged" into the AT connector, wherein the mating connectors correspond to the distinct pin groupings or segments of the electronic connector. It would be advantageous, therefore, to configure the electronic connector associated with the PCBA and the mating electronic connector(s) in such a manner that the number of parts required to obtain the desired electronic interface is minimized, and the assembly procedure involving the various components of the electronic connector assembly is simplified.

Accordingly, there has been a need for a novel assembly of electronic components which facilitates assembly of the PCBA to the electronic connector with no hard-mounting of such components to one another, and which further permits the hard-mounting of these components when assembled to the disk drive unit itself. Preferably an improved electronic connector would be provided that would permit automated pick and place of the connector onto the PCBA in accordance with efficient manufacturing techniques. Such an improved electronic connector must maintain the flexibility and versatility for modification into standard configurations (for example, SCSI, SCA or AT configurations), and must not be appreciably more expensive to manufacture than standard electronic connectors. Further, a self-aligning, mating electronic connector assembly is needed which minimizes the mating electronic components and which provides guides that ensure proper alignment of the mating electronic connector assembly components prior to inserting the conductive pins into pin receiving apertures. The present invention fulfills these needs and provides other related advantages.

SUMMARY OF THE INVENTION

The present invention resides in a self-aligning, mating electronic connector assembly. The connector assembly comprises, generally, a first electronic connector including a non-conductive housing having an inboard side, an oppositely facing outboard side, a pin supporting wall extending the width thereof, and a plurality of conductive pins extending generally perpendicularly from an outboard side of the pin supporting wall. The connector assembly further comprises a second electronic connector which includes a non-conductive housing receivable within a portion of the first electronic connector housing. The second connector housing has a front side defining a plurality of apertures for receiving the plurality of conductive pins, and a plurality of mating guides extending outwardly from the front side thereof. The mating guides slidably engage corresponding portions of the first electronic connector housing to properly align the second electronic connector with the first electronic connector prior to inserting the conductive pins into the pin receiving apertures.

In a preferred form of the invention, the second electronic connector housing includes a first key that extends upwardly from the second electronic connector housing. The first electronic connector housing includes a slot for receiving the first key when the first and second electronic connectors are properly aligned and the front side of the second electronic connector is inserted into the outboard side of the first electronic connector. The key-receiving slot is formed in an upper wall of an enclosure for the conductive pins. The first electronic connector includes a second key formed in an upper wall of the enclosure for the conductive pins and which extends downwardly therefrom. The second electronic connector housing includes a channel for receiving the second key when the first and second electronic connectors are properly aligned and the front side of the second electronic connector is inserted into the outboard side of the first electronic connector. The key-receiving channel is formed in an upper surface of the second electronic connector housing. The pin supporting wall of the first electronic connector housing includes a plurality of apertures therethrough for receiving the plurality of mating guides.

The first electronic connecter further includes a plurality of soldertails which correspond to the conductive pins and which extend from an inboard side of the pin supporting wall. A plurality of gripper arms extend from the inboard side of the housing for receiving and securing an edge of a printed circuit board assembly (PCBA) therein through an interference fit such that the soldertails engage only side of the PCBA. Each soldertail includes a PCBA contact pad, and all of the contact pads are co-planar. Each gripper arm includes an upper portion and a lower flange which cooperatively define a slot therebetween into which the edge of the PCBA is inserted. To facilitate the interference fit between the PCBA and the electronic connector, crush ribs are provided within the PCBA edge-receiving slot of the gripper arms. A pair of mounting ears extend from a respective pair of the plurality of gripper arms. The mounting ears are configured to receive a mounting screw therethrough for attaching the first electronic connector to a support structure, such as a hard drive assembly (HDA) housing. Each mounting ear includes a planar PCBA engaging surface and an open-ended slot in an end thereof. The gripper arms and the mounting ears are integrally formed with the housing for the first electronic connector.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is an enlarged, fragmented sectional view of the assembled electronic connector assembly taken generally along the line 3—3 of FIG. 2;

FIG. 4 is a top plan view of the second electronic connector shown in FIGS. 1–3;

FIG. 5 is a front elevational view of the second electronic connector taken generally along the line 5—5 of FIG. 4.

DETAILED DESCRIPTION OF THE PREFERRED EMBODIMENT

Figure 1:
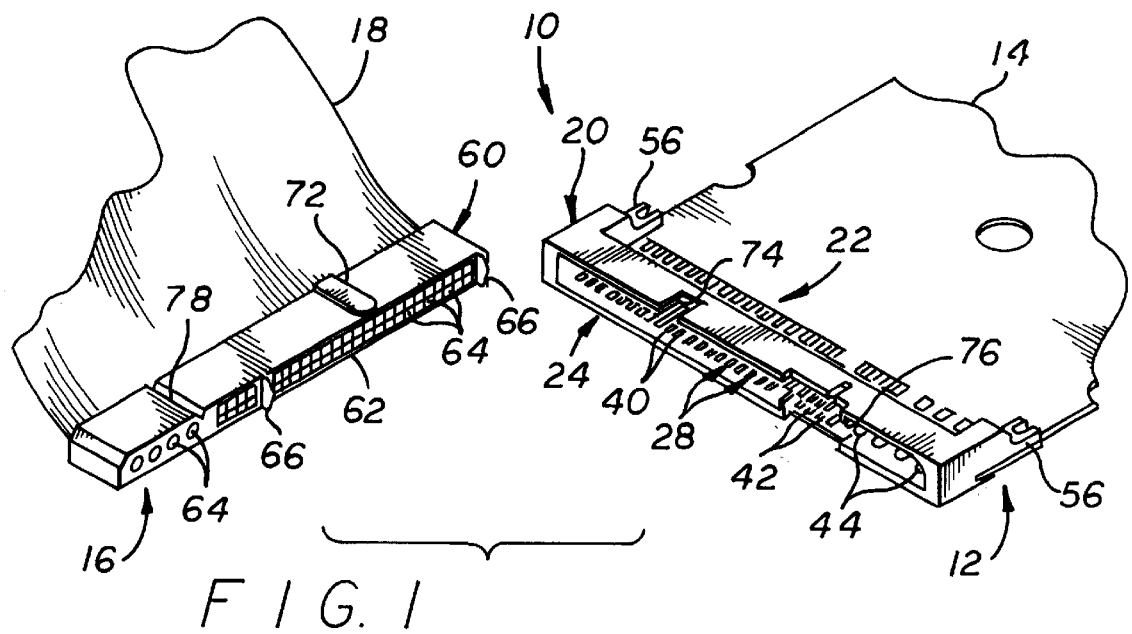
FIG. 1 is an exploded perspective view of a self-aligning, mating electronic connector assembly embodying the invention, illustrating a first electronic connector mounted to a printed circuit board assembly (PCBA), and a second electronic connector having ribbon cable extending therefrom.
Figure 2:
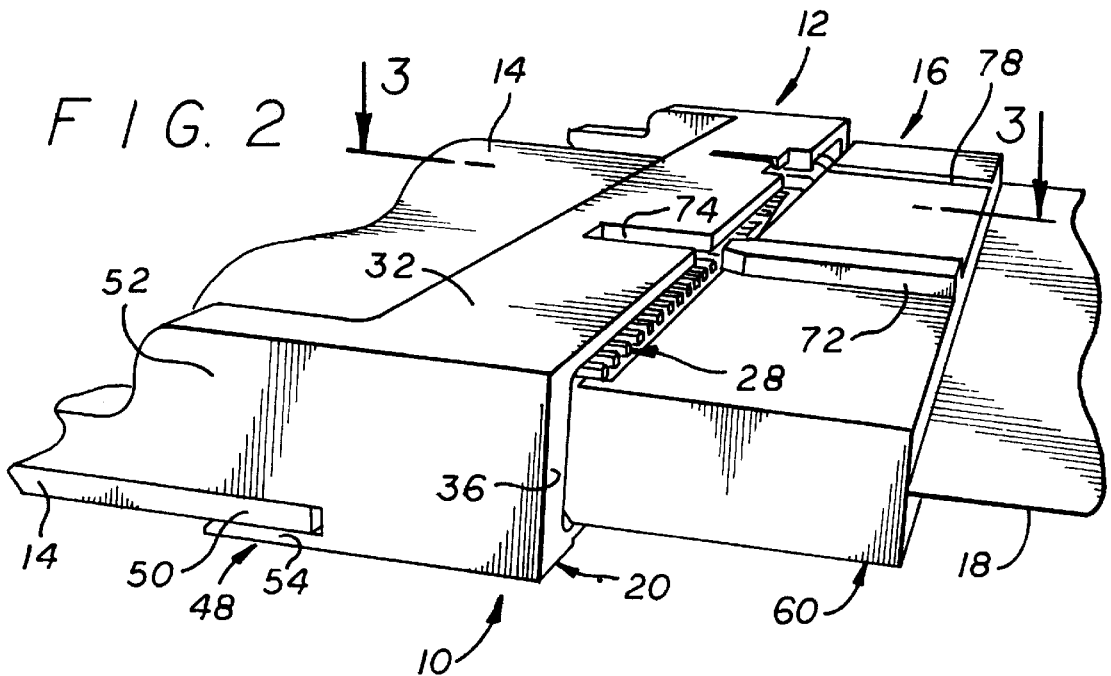
FIG. 2 is an enlarged partially fragmented perspective view of the electronic connector assembly shown in FIG. 1 from a reverse angle, illustrating the second electronic connector partially inserted into the first electronic connector.

As shown in the drawings for purposes of illustration, the present invention is concerned with a self-aligning, mating electronic connector assembly, generally designated in the accompanying drawings by the reference number 10, which comprises a first electronic connector 12 that is mounted to a printed circuit board assembly (PCBA) 14, and a second electronic connector 16 that is attached to ribbon cable 18 of the host system. The first electronic connector 12 comprises a component of an electronic assembly that includes the printed circuit board assembly 14 and a support structure (such as a housing for a disk drive unit or hard disk assembly) to which the PCBA 14 and first electronic connector 12 are mounted.

In accordance with the present invention, the first electronic connector 12 comprises a non-conductive connector housing 20 that has an inboard side 22, an oppositely facing outboard side 24, and a pin supporting wall 26 that extends the width of the housing 20. A plurality of conductive pins 28 extend generally perpendicularly from an outboard side of the pin supporting wall 26, and a plurality of soldertails 30 corresponding to the conductive pins 28 extend from an inboard side of the pin supporting wall 26. On the outboard side 24 of the connector housing 20 are provided upper and lower pin enclosing walls 32 and 34, and first and second end walls 36 and 38 which, collectively, form an enclosure for the conductive pins 28. The particular electronic connector 12 illustrated is an AT, 3-in-1 standard-type connector including a forty pin AT I/O interface 40, nine option pins 42, and four power pins 44. Each of the conductive pins 28 has a corresponding soldertail 30 that extends through the pin supporting wall 26. The soldertails 30 each include a PCBA contact pad 46. All of the soldertails 30 extending on the inboard side 22 of the first connector housing 20 have PCBA contact pads 46 that are co-planar.

Molded integrally with the first connector housing 20 and extending on the inboard side 22 thereof are a plurality of gripper arms 48 which are configured to receive and secure an edge 50 of the PCBA 14 therein through an interference fit such that the coplanar PCBA contact pads 46 of the soldertails 30 engage only one side of the PCBA, and specifically on solder pads provided thereon. The gripper arms 48 include an upper portion 52 and a lower flange 54 which cooperatively define a slot therebetween into which the edge 50 of the PCBA 14 is inserted. Extending from the lower flange 54 upwardly into the PCBA edge-receiving slot are a pair of crush ribs. The upper ends of the crush ribs are typically coined off as the edge 50 of the PCBA 14 is inserted into the slot in a manner ensuring a snug interference fit between the first electronic connector 12 and the PCBA 14.

The two outermost gripper arms 48 are further each provided a mounting ear 56 that includes a planar PCBA engaging surface and an open-ended slot 58 in an end thereof. When the edge 50 of the PCBA 14 is inserted into the slots provided in the gripper arms 48 between the upper portion 52 and the lower flange 54, the slots 58 of the mounting ears 56 are aligned with two mounting apertures of the PCBA 14.

As illustrated in greater detail in the related copending parent application Ser. No. 08/772,171 filed Nov. 25, 1996 and entitled SINGLE-SIDED ELECTRONIC CONNECTOR AND METHOD OF ASSEMBLY, the contents of which are incorporated herein, the first electronic connector 12, so constructed, lends itself to automated pick and place of the connector 12 onto the PCBA 14, which greatly simplifies the assembly process. In this regard, solder paste is typically provided on the solder pads of the PCBA 14, and automated machinery then simply plucks an electronic connector 12, places it over the edge 50 of the PCBA 14, and presses the two components together so that the edge 50 is inserted into the slots provided the gripper arms 48. In order to solder the first electronic connector 12 to the PCBA 14, the assembled PCBA and electronic connector are run through an infrared reflow in the standard manner. The assembled electronic connector 12 and PCBA 14 may then be hard-mounted to the HDA housing by placing the assembly adjacent to the HDA housing so that the mounting apertures of the PCBA 14 are aligned with apertures of the HDA housing. Mounting screws are then placed through the aligned apertures to hard-mount the PCBA 14 to the HDA housing in a standard fashion. The electronic connector 12 is simultaneously hard-mounted to the HDA housing because the mounting ears 56 are interposed between and at least partially surround the aligned apertures of the HDA housing and the PCBA 14.

Figure 6:
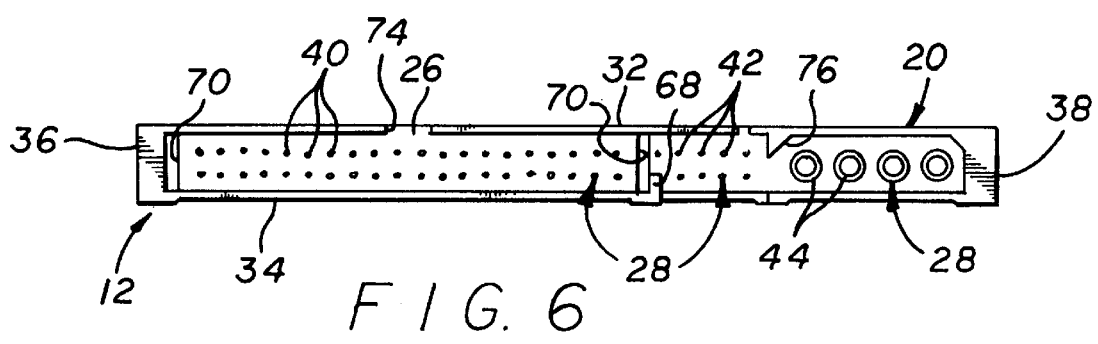
FIG. 6 is a front elevational view of the first electronic connector of FIGS. 1–3.

As illustrated in FIGS. 1–5, the second electronic connector 16 comprises a molded housing 60 that has a front side 62 configured to be inserted or "plugged" into the enclosure for the conductive pins 28 defined by the upper and lower walls 32 and 34 and the end walls 36 and 38 of the first electronic connector housing 20. The front side 62 of the housing 60 defines a plurality of apertures 64 for receiving the conductive pins 28. A pair of mating guides 66 extend outwardly from the front side 62 of the second electronic connector housing 60. The mating guides 66 slidably engage corresponding portions of the first electronic connector housing 20 to align the second electronic connector 16 with the first electronic connector 12 prior to inserting the conductive pins 28 into the pin receiving apertures 64. In this regard, the mating guides 66 are positioned on the front side 62 of the housing 60 of the second electronic connector 16 so as to engage an interior surface of the first end wall 36 and an intermediate wall 68 extending upwardly into the pin enclosure from the lower wall 34. The pin supporting wall 26 of the first housing 20 further includes a pair of rectangular apertures 70 for receiving the mating guides 66 when the second electronic connector 16 is fully inserted into the first electronic connector 12 (see FIGS. 3 and 6).

The second electronic connector housing 60 further includes a first key 72 that extends upwardly from an upper surface thereof, and the first electronic connector housing 20 includes a slot 74 formed in the upper wall 32 of the enclosure for the conductive pins 28, for receiving the first key 72 when the first and second electronic connectors 12 and 14 are properly aligned and the front side 62 of the second electronic connector is inserted into the outboard side 24 of the first electronic connector. The first electronic connector housing 20 includes a second key 76 which is formed in the upper wall 32 of the enclosure for the conductive pins 28 and which extends downwardly from the upper wall. The second electronic connector 16 includes a channel 78 formed in an upper surface of the second electronic connector housing 60, for receiving the second key 76 when the first and second electronic connectors are properly aligned and the front side 62 of the second electronic connector is inserted into the outboard side 24 of the first electronic connector 12. See FIGS. 1–6.

From the foregoing it will be appreciated that the self-aligning, mating electronic connector assembly 10 of the present invention permits the consolidation of multiple plugs or connectors insertable into the first electronic connector 12, into a single second electronic connector 16. The mating guides 66 prevent the front side 62 of the housing 60 of the second electronic connector 16 from entering the enclosure for the conductive pins 28 of the second electronic connector housing 20 unless the two electronic connectors 12 and 14 are properly aligned. The interfitting of the first key 72 within the slot 74 and the second key 76 within the channel 78 further assure proper alignment between the two electronic connectors as the conductive pins 28 are pressed into the pin-receiving apertures 64 of the second electronic connector 16. Use of a single-sided electronic connector 12 further allows automated assembly of the connector to the PCBA 14. There is no hard mounting of the connector 12 to the PCBA, but rather these two components are held together simply through an interference fit which may be accomplished utilizing simple pick and place manufacturing techniques. Further, provision of the mounting ears 56 integrally molded with the gripper arms 48 and the housing 20 of the first electronic connector 12 permits hard mounting of the electronic connector 12 to the HDA housing simultaneously with hard mounting of the PCBA 14 thereto.

Although a particular embodiment of the invention has been described in detail for purposes of illustration, various modifications may be made without departing from the spirit and scope of the invention. Accordingly, the invention is not to be limited, except as by the appended claims.

We claim:

1. A self-aligning, mating electronic connector assembly, comprising:

a first electronic connector including a non-conductive housing having an inboard side, an oppositely facing outboard side, a pin supporting wall extending between the inboard side and the outboard side thereof, and a plurality of conductive pins extending generally from an outboard side of the pin supporting wall; and a second electronic connector including a non-conductive housing receivable with a portion of the first electronic connector housing and having a front side defining a plurality of apertures for receiving the plurality of conductive pins, and a plurality of mating guides extending outwardly from the front side thereof that slidably engage corresponding portions of the first electronic connector housing to properly align the second electronic connector with the first electronic connector when the conductive pins are inserted into the pin receiving apertures, and at least one of the guides being located between the apertures.

2. The electronic connector assembly of claim 1, wherein the second electronic connector housing includes a key, and the first electronic connector housing includes a slot for receiving the key when the first and second electronic connectors are properly aligned and the front side of the second electronic connector is inserted into the outboard side of the first electronic connector.

3. The electronic connector assembly of claim 2, wherein the key extends upwardly from the second electronic connector housing, and wherein the key-receiving slot is formed in an upper wall of an enclosure for the conductive pins.

4. The electronic connector assembly of claim 1, wherein the first electronic connector housing includes a key, and the second electronic connector housing includes a channel for receiving the key when the first and second electronic connectors are properly aligned and the front side of the second electronic connector is inserted into the outboard side of the first electronic connector.

5. The electronic connector assembly of claim 4, wherein the key is formed in an upper wall of an enclosure for the conductive pins and extends downwardly therefrom, and wherein the key-receiving channel is formed in an upper surface of the second electronic connector housing.

6. The electronic connector assembly of claim 1, wherein the pin supporting wall of the first electronic connector housing includes a plurality of apertures therethrough for receiving the plurality of mating guides.

7. The electronic connector assembly of claim 1, wherein the first electronic connector includes a plurality of soldertails corresponding to the conductive pins and extending from an inboard side of the pin supporting wall, and a plurality of gripper arms the inboard side of the first electronic connector housing, for receiving and securing an edge of a printed circuit board assembly (PCBA) therein through an interference fit such that the soldertails engage only one side of the PCBA, and not on the other side of the PCBA.

8. The electronic connector assembly of claim 7, wherein each soldertail includes a PCBA contact pad, and wherein the contact pads are co-planar.

9. The electronic connector assembly of claim 8, wherein each gripper arm includes an upper portion and a lower flange which cooperatively define a slot therebetween into which the edge of the PCBA may be inserted.

10. The electronic connector assembly of claim 9, including crush ribs within the PCBA edge-receiving slot.

11. The electronic connector assembly of claim 9, including a pair of mounting ears which extend from a respective pair of the plurality of gripper arms, wherein the mounting ears are configured to receive a mounting screw therethrough for attaching the first electronic connector to a support structure.

12. The electronic connector assembly of claim 11, wherein each mounting ear includes a planar PCBA engaging surface and a slot in an end thereof.

13. A self-aligning, mating electronic connector assembly, comprising:
   a first electronic connector including a non-conductive housing having an inboard side, an oppositely facing outboard side, a pin supporting wall extending between the inbound side and the outbound side and a plurality of conductive pins extending generally from an outboard side of the pin supporting wall; and
   a second electronic connector including a non-conductive housing receivable with a portion of the first electronic connector housing and having a front side defining a plurality of apertures for receiving the plurality of conductive pins,
   wherein the first electronic connector includes a plurality of soldertails corresponding to the conductive pins and extending from an inboard side of the pin supporting wall, and means extending on the inboard side of the first electronic connector housing, for receiving and securing a printed circuit board assembly (PCBA) such that soldertails engage only one side of the PCBA, and not the other side of the PCBA.

14. The electronic connector assembly of claim 13, wherein one of the electronic connector housing includes a key, and the other of the electronic connector housings includes a slot or channel for receiving the key when the first and second electronic connectors are properly aligned and the front side of the second electronic connector is inserted into the first electronic connectors, and wherein the key extends upwardly from the second electronic connector housing, and wherein the key-receiving slot is formed in an upper wall of an enclosure for the conductive pins.

15. The electronic connector assembly of claim 13, wherein one of the electronic connector housing includes a key, and the other of the electronic connector housings includes a slot or channel for receiving the key when the first and second electronic connectors are properly aligned and the front side of the second electronic connector is inserted into the first electronic connectors, and wherein the key is formed in an upper wall of an enclosure for the conductive pins and extends downwardly therefrom, and wherein the key-receiving channel is formed in an upper surface of the second electronic connector housing.

16. The electronic connector assembly of claim 13, wherein the pin supporting wall of the first electronic connector housing includes a plurality of apertures therethrough for receiving the plurality of mating guides.

17. A self-aligning, mating electronic connector assembly, comprising:
   a first electronic connector including a non-conductive housing having an inboard side, an oppositely facing outboard side, a pin supporting wall extending the width thereof between the inbound side and the outbound side and a plurality of conductive pins extending generally from an outboard side of the pin supporting wall; and
   a second electronic connector including a non-conductive housing receivable within a portion of the first electronic connector housing and having a front side defining a plurality of apertures for receiving the plurality of conductive pins, and a plurality of mating guides extending outwardly from the front side thereof that slidably engage corresponding portions of the first electronic connector housing to properly align the second electronic connector with the first electronic connector when the conductive pins are inserted into the pin receiving apertures;
   wherein one of the electronic connector housing includes a key, and the other of the electronic connector housings includes a slot or channel for receiving the key when the first and second electronic connectors are properly aligned and the front side of the second electronic connector is inserted into the first electronic connectors,
   wherein the first electronic connector includes a plurality of soldertails corresponding to the conductive pins and extending from an inboard side of the pin supporting wall, and a plurality of gripper arms extending from the inboard side of the first electronic connector housing for receiving and securing an edge of a printed circuit board assembly (PCBA) therein through an interference fit such that the soldertails engage only one side of the PCBA, wherein each soldertail includes a PCBA contact pad and the contact pads are co-planar, each gripper arm includes an upper portion and a lower flange which cooperatively define a slot therebetween into which the edge of the PCBA may be inserted, and wherein the first electronic connector further includes a pair of mounting ears which extend from a respective pair of the plurality of gripper arms, wherein the mounting ears are configured to receive a mounting screw therethrough for attaching the first electronic connector to a support structure.

18. A self-aligning, mating electronic connector assembly, comprising:
   a first electronic connector including a non-conductive housing having an inboard side, an oppositely facing outboard side, a pin supporting wall extending between the inbound side and the outbound side thereof, and a plurality of conductive pins extending generally from an outboard side of the pin supporting wall; and
   a second electronic connector including a non-conductive housing receivable with a portion of the first electronic connector housing and having a front side defining plurality of apertures for receiving the plurality of conductive pins, and a plurality of mating guides extending outwardly from the front side thereof that slidably engage corresponding portions of the first electronic connector housing to properly align the second electronic connector with the first electronic connector when the conductive pins are inserted into the pin receiving apertures;

wherein the second electronic connector housing includes a first key that extends upwardly from the second electronic connector housing, and the first electronic connector housing includes a slot for receiving the first key when the first and second electronic connectors are properly aligned and the front side of the second electronic connector is inserted into the outboard side of the first electronic connector, the key-receiving slot being formed in an upper wall of an enclosure for the conductive pins;

wherein the first electronic connector includes a second key formed in an upper wall of the enclosure for the conductive pins and which extends downwardly therefrom, and the second electronic connector housing includes a channel for receiving the second key when the first and second electronic connectors are properly aligned and the front side of the second electronic connector is inserted into the outboard side of the first electronic connector, wherein the key-receiving channel is formed in an upper surface of the second electronic connector housing; and wherein the pin supporting wall of the first electronic connector housing includes a plurality of apertures therethrough for receiving the plurality of mating guides.

19. The electronic connector assembly of claim 18, wherein the first electronic connector includes a plurality of soldertails corresponding to the conductive pins and extending from an inboard side of the pin supporting wall, and a plurality of gripper arms extending from the inboard side of the first electronic connector housing for receiving and securing an edge of a printed circuit board assembly (PCBA) therein through an interference fit such that the soldertails engage only one side of the PCBA, wherein each soldertail includes a PCBA contact pad and the contact pads are co-planar, each gripper arm includes an upper portion and a lower flange which cooperatively define a slot therebetween into which the edge of the PCBA may be inserted, and wherein the first electronic connector further includes a pair of mounting ears which extend from a respective pair of the plurality of gripper arms, wherein the mounting ears are configured to receive a mounting screw therethrough for attaching the first electronic connector to a support structure.

20. The electronic connector assembly of claim 19, wherein the gripper arms and the mounting gears are integrally formed with the first electronic connector housing.

* * * * *

UNITED STATES PATENT AND TRADEMARK OFFICE
CERTIFICATE OF CORRECTION

PATENT NO. : 5,816,842

DATED : October 6, 1998

INVENTOR(S) : Thantrakul, et al

It is certified that error appears in the above-identified patent and that said Letters Patent is hereby corrected as shown below:

On the Title Page, Item [63], please change "Ser. No. 772,171" to ----- Ser. No. 756,278 ----.

In column 1, line 6, please change "Ser. No. 772,171" to --Ser. No. 756,278--.

In column 4, line 58, please change "Ser. No. 772,171" to --Ser. No. 756,278--.

Signed and Sealed this

Third Day of April, 2001

*Attest:*

NICHOLAS P. GODICI

*Attesting Officer*     *Acting Director of the United States Patent and Trademark Office*